NOISE IMMUNE VIDEO CIRCUITS

Filed May 13, 1968

INVENTORS
GEORGE E. ANDERSON &
JOHN N. PRATT
BY Eugene M. Whitacre
ATTORNEY 3,535,444

NOISE IMMUNE VIDEO CIRCUITS

George E. Anderson, New Brighton, Minn., and John N. Pratt, Indianapolis, Ind., assignors to RCA Corporation, a corporation of Delaware Filed May 13, 1968, Ser. No. 728,630
Int. Cl. H04n 3/16
U.S. Cl. 178—7.3 7 Claims

ABSTRACT OF THE DISCLOSURE

There is disclosed a video amplifier for driving sync, AGC and chroma circuits. The video amplifier operates with a D.C. referenced detector coupled to an input electrode of the pentode. A clamping circuit is coupled between the cathode and grid electrodes of the pentode to clamp noise pulses at the input thereof which exceed a level determined by the D.C. reference voltage on the detector. Cathode bias is employed, with respect to this D.C. reference bias, to operate the pentode in a linear region of its characteristics while providing a pre-bias for said clamping circuit.

Figures 1, 2:
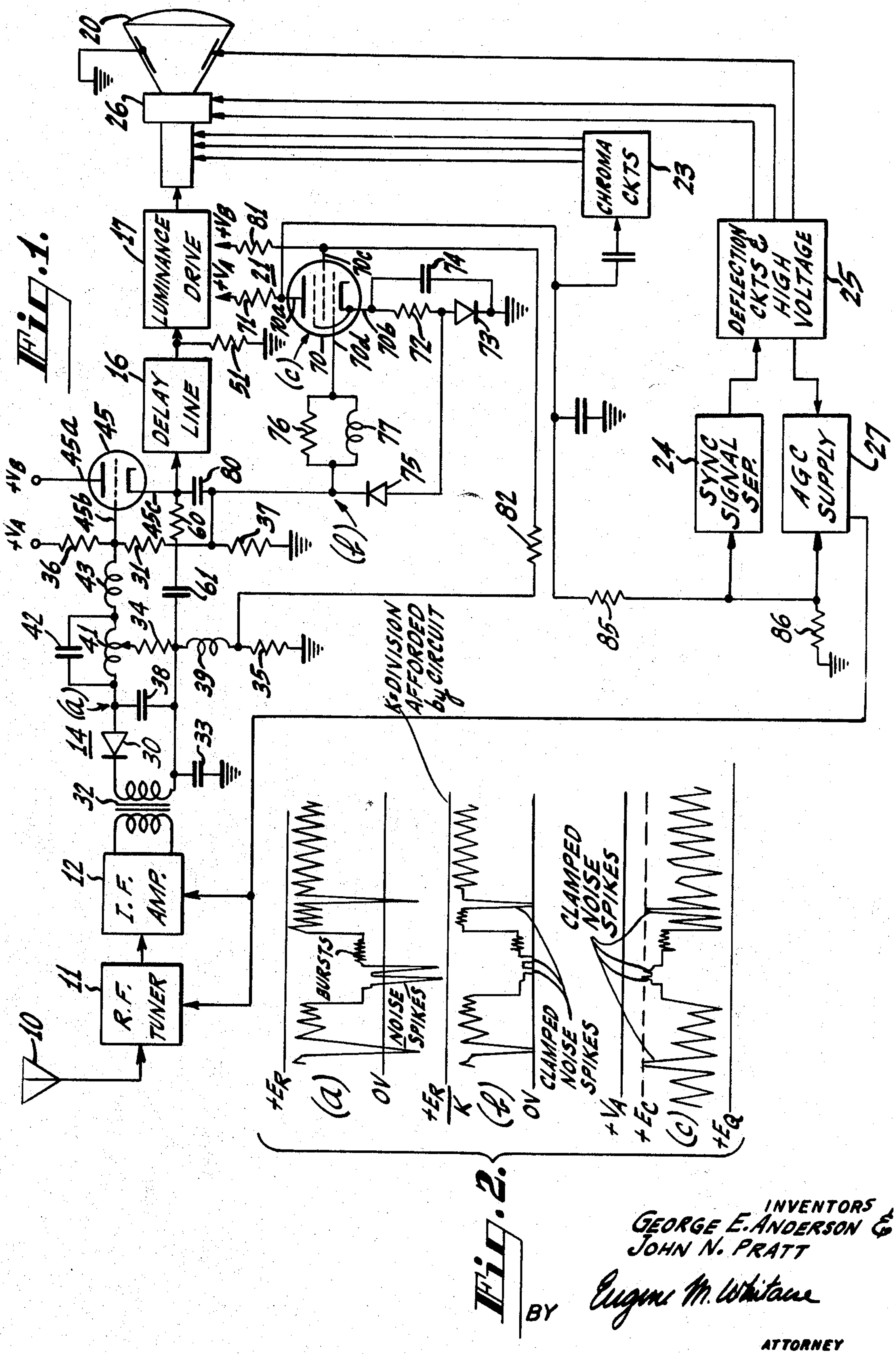

This invention relates to video amplifier circuits and more particularly to such circuits for use in providing noise immune video drive to signal processing channels found in a color television receiver.

In color television receivers there is a channel for translating the luminance signals and one for translating the chrominance signals. The luminance signals convey brightness information, corresponding to the conventional monochrome signal and are coupled to suitable electrodes, such as the cathodes, of a three-gun kinescope to reproduce a black and white picture on the viewing screen of the tube. The chrominance signals convey the color aspects of the image and are processed in the receiver to obtain three color signals therefrom. These signals are then coupled to the grids of the three-gun tube to add color information to the black and white picture.

The bandwidth of the luminance channel is appreciably greater than the bandwidth of the chrominance channel. Due to this difference in bandwidth a greater time delay is induced into the narrow band chrominance channel than that induced into the wide band luminance channel. As a result luminance and chrominance information entering the video processing circuits together will be delivered out of phase to the picture tube unless something is done to equalize the delay in the different bands.

It is conventional practice, therefore, to include a video delay network in the luminance channel to equalize the time delays of the two channels so that the luminance information will arrive at the picture tube in time coincidence with the chrominance information. Such a luminance delay is usually associated with a low impedance delay line which therefore has to be driven at a suitable signal level by a relatively low impedance source necessary to match the characteristic impedance of the delay line.

The CTC 22 color television receiver descibed in RCA Service Data Bulletin, No. T11 (1967) utilizes a delay line driver as an input to an amplifier which serves to provide higher level video to other conventional channels found in the compatible receiver. These channels or circuits are normally referred to as the chrominance channel, the sync separator circuit and the automatic gain control circuit. There is a need to operate some of these other channels, such as sync and AGC, under relatively noise immune conditions. Coupled with this desire is the overall condition of fabricating a receiver so that it functions reliably and is economical as well.

The prior art includes noise inverting circuits which by necessity usually employ an additional stage of amplification or an additional active device as a vacuum tube or a transistor. There are also techniques for eliminating adverse noise pulses by limiting, filtering and so on. In many present color receivers, a common technique employed, uses an active device, such as a vacuum tube pentode, which has its input coupled to a low impedance delay line driver. This pentode is biased on a point of its operating characteristics such as that noise pulses of an amplitude sufficient to cause malfunctioning of the sync circuit or the AGC, will bias the pentode into cutoff thereby preventing further gain to such noise. However, such receivers employing this technique, while economical, still suffer in that the noise limiting properties are a function of the quiescent operating point stability of the active device. The stage can not conveniently be biased at a point on its operating characteristics to provide both optimum noise performance and maximum linear gain. Furthermore, in the case of certain vacuum tubes, as the bias point approaches cutoff, the plate voltage verses current characteristics are more compressed than, for example, they are in a region defining true Class A operation. As a tube ages or due to manufacturing tolerances the quiescent operating point, designed for Class A operation, might drift into this compresesd region and hence result in non-linear operation.

It is therefore an object of the present invention to provide an improved video amplifier for driving circuits in a receiver with low noise video signals.

It is a further object to provide a video amplifier for AGC, sync and chroma takeoff which is operated on a point of its characteristics to provide optimum and linear gain while providing an improved noise immune signal.

These and further objects of the present invention are provided in one embodiment by coupling the input of a cathode follower stage to the output of the second or video detector of the television receiver. The cathode follower provides a low impedance luminance drive to the luminance delay and serves as a takeoff point for a video amplifier used to supply higher level video for the chrominance synchronizing and automatic gain control circuits.

The detector is referenced to a D.C. potential which is superimposed upon the D.C. component obtained therefrom due to the presence of video signals. The output of the detector being coupled to the input of a cathode follower is further coupled to the input of a video amplifier used to drive the sync, AGC and chroma circuits. The cathode of this amplifier is returned to ground through a resistor in series with a diode of suitable polarity both of which supply a cathode bias, assuring that this amplifier, together with that D.C. voltage impressed on its input from the detector, operates in a reasonably linear region of its characteristics. The junction between the resistor and the diode is coupled back to the input of the amplifier by means of a further unidirectional current device which operates to clamp the input to the amplifier at a fixed level when noise of a sufficient amplitude is present.

For a better understanding of the present invention reference is made to the following description, taken in conjunction with the accompanying drawings, in which:

FIG. 1 is a schematic circuit, partly in block form, of a color television receiver embodying a particular form of the present invention.

FIG. 2*a* shows the waveform at the output of the detector 14 of FIG. 1.

FIGS. 2*b* and 2*c* show the clamped noise pulses in the video signal.

Referring now to FIG. 1, there is shown an antenna 10 capable of receiving the incoming composite signal and applying it to the radio frequency (RF) tuner 11. Tuner 11 is of suitable construction and may include, for example, a radio frequency amplifier for amplifying the received composite television signal and a heterodyne oscillator and mixer for converting the frequency of the main television carrier to an intermediate frequency (IF).

The intermediate frequency is coupled to the IF amplifier 12 where it is further amplified and applied to a video detector circuit 14. Detector circuit 14 is effective to recover the video and subcarrier frequency components from the intermediate frequency signal and to produce a composite video signal output including luminance and chrominance components. The luminance signal components are coupled via a first video amplifier 15 through a delay line 16 and a second video amplifier 17 (labelled as luminance drive) to the three-gun shadow mask picture tube 20. More particularly this signal is coupled to the cathodes of the picture tube 20 to intensity modulate the three electron beams thereof. Video detector 14, first video amplifier 15, the delay line 16 and the luminance drive amplifier 17 may therefore be considered to comprise the luminance channel of the color television receiver.

The luminance signal components are also coupled from the detector circuit 14 to a pentode amplifier 21. The chrominance signal components of the composite video signal are also coupled to the input of video amplifier 21 via the first video amplifier 15; and from the output of amplifier 21 to the chroma circuits 23 of the television receiver. These circuits 23 include the usual chrominance amplifier, reference signal oscillator and color demodulators for deriving the color information signals for the picture tube 20. These signals are coupled to the control grids of the three electron guns of the tube 20. Video detector 14, first video amplifier 15, amplifier 21 and chroma circuits 23 may be considered to comprise the chrominance channel of the color receiver.

The output of amplifier 21 is also utilized as a composite video signal source for the synchronizing signal separator 24 which functions to extract the synchronizing signals from the composite video and supply them to the deflection system 25 of the receiver. The system 25 includes the vertical deflection circuits and the horizontal deflection circuits which respectively supply field scanning and line scanning signals to the deflection yoke 26 associated with the picture tube 20. The deflection circuit 25 additionally includes a high voltage power supply which provides the operating potential required by the ultor electrode of the kinescope 20. An automatic gain control (AGC) supply 27 is shown coupled to the output of the amplifier 21 and supplies gain control signals to the RF amplifier in the tuner 11 and to the IF amplifier 12. AGC unit 27 may be of the variety that is keyed by pulses supplied from the horizontal deflection circuits in unit 25.

A sound reproducing channel (not shown) is also coupled to the output of the IF amplifier 12 for recovering the intercarrier sound signals as is well known.

Examination of the circuitry shown in schematic detail in FIG. 1 indicates that the video detector 14 includes a diode 30 inductively coupled by means of a coupling transformer 32 to the IF amplifier 12. Capacitor 38 serves to bypass IF frequencies at the output of the detector 30. Capacitor 33 acts as an A.C. ground return for the detector 14. The combination of the inductor 41 shunted by capacitor 42 behaves as a trap for the intercarrier sound beat while inductor or coil 43 acts as a series peaking coil. The trap and the peaking coil 43 couples the anode electrode of detector diode 30 to the grid electrode **45*b* of a vacuum tube triode 45 used in the first video amplifier stage 15. The plate electrode 45*a* of triode amplifier 45 is coupled directly to a source of potential $+V_B$. A bias is supplied to the control grid 45*b* via the resistor divider comprising resistors 31, 36, and 37 connected between a source of potential $+V_A$ and ground, the junction between resistors 31 and 36 being coupled to the grid electrode 45*b*. The control grid electrode 45*b* will be referred to as the input terminal of the first video amplifier 15, while the cathode electrode 45*c* will be referred to as the output of the amplifier 15. The output terminal or the cathode electrode 45*c* of triode 45 is coupled to the input of the delay line 16. The delay line 16 has a substantially linear phase response and a reasonably uniform amplitude response over the bandwith of the luminance channel. Such a delay line 16, is a relatively low impedance device, on the order of 680 ohms, and is properly terminated to minimize reflections at its output by resistor 51 coupled at the output to ground. The delay line 16 and resistor 51 further providing a direct current return path for the cathode electrode of the triode 45**.

The delay line 16 also has its output coupled to the input of a video amplifier or driver 17, whose output is used to drive the cathode electrodes of the kinescope 20. The amplifier 15 operates as a cathode follower for low frequency luminance signals and as a boot strap amplifier for higher frequency luminance and chrominance signal components. This circuit provides the advantage that the video diode detector 14 can operate into a desired high impedance load while a low impedance delay line can be used. For further advantages of this boot strapping technique see U.S. 3,328,519 entitled "Luminance Amplifier Circuitry for a Color Television Receiver," by D. H. Willis issued on June 27, 1967. In the manner described in this reference, coil 60 and capacitor 61 serve together with coil 39 and resistor 35 to enable proper feedback and boot-strapping action for amplifier 15.

A pentode amplifier 21 is shown to provide signals used for purposes of synchronization, gain control and chrominance processing. Amplifier 21 includes a pentode type vacuum tube 70 having an anode, cathode, screen and control grid electrodes **70*a*, 70*b*, 70*c*, and 70*d* respectively. The anode electrode 70*a* is coupled to a source of operating potential $+V_A$ via a load resistor 71; while the cathode electrode 70*b* is coupled to a biasing resistor 72 in series with a diode 73 having its cathode connected to ground. The series path of resistor 72 and diode 73 is bypassed for high frequencies by capacitor 74. Another diode 75 has its anode coupled to the junction between resistor 72 and diode 73 and its cathode is returned to the grid electrode 70*d* of pentode 70 through a peaking network comprising a damping resistor 76 in shunt with a peaking coil 77. A high frequency A.C. signal path is provided for amplifier 21 by capacitor 80 coupling the cathode electrodes 45*c* or output of amplifier 15 to the grid electrode 70*d* of pentode 70. A D.C. path is provided from the detector 14 to the control grid 70*d* of pentode 70 by resistor 31 forming part of the voltage divider biasing amplifier 15. This resistor 31 provides a D.C. path for the lower frequency luminance signals supplied by detector 14 and further aids to operate the grid electrode 70*d*** at a suitable potential.

The screen electrode **70*c* of pentode 70 is biased by means of a resistor 81 connected between the screen electrode 70*c* and a source of potential $+V_A$. A resistor 82 coupled between the screen electrode 70*c* and the junction of inductor 39 and resistor 35 is included to reference the cathode of detector diode 30 to a positive voltage slightly less than the voltage on the anode of the diode 30. The voltage on the anode of diode 30 is determined in part by the bias of the cathode follower stage 15, including triode 45, which is biased at an efficient operating point due to the divider comprising resistors 36, 31, and 37 and the voltage applied thereto via resistors 34, 35, and 82. This bias arrangement also serves to raise the bias at the grid electrode 70*d* of the pentode amplifier 21, which electrode is coupled to the detector via resistors 31 and 37. A cathode impedance for pentode 70, as resistor 72 and diode 73 is used to assure operation of the pentode 70 in a linear region of its characteristics. The D.C. biasing of the detector also serves to provide a suitable white reference level for detected video signals. Therefore the D.C. referencing of the detector and the coupling described assures a common drive source for both the triode 45 and pentode 70, via detector 14**.

The operation of the amplifier will be explained with reference to the diagrams shown in FIG. 2. FIG. 2*a* shows the waveform at the output of the detector 14 of FIG. 1. Voltage $+E_R$ is the bias voltage supplied to the diode detector 14 via resistors 82 and 36 of FIG. 1. The video signal is of a polarity with sync negative going as determined by the polarity of the detector diode 30. The reference potential point or ground is designated as zero volts (0 v.).

The negative going video waveshape shown in FIG. 2*a* has typical noise spikes present during the video information and during the sync intervals. This signal is coupled to the pentode amplifier 21, whose grid electrode **70*d* is also referenced at the $+E_R$ voltage, reduced by the division ratio, K, of resistors 31 and 37. This positive voltage at the grid electrode 70*d* is counteracted by the positive voltage across the cathode load of resistor 72 and diode 73 to operate amplifier 21 on a linear portion of its characteristics. Diode 73 is forward biased and provides a fixed voltage drop from anode to cathode of about .7 volt (dependent upon the diode type, i.e., germanium or silicon). This voltage is applied to the anode of diode 75 which has a positive voltage on its cathode and hence is reversed biased, as this voltage is substantially greater than the 0.7 volt. As the composite video signals swings negative at the grid electrode 70*d*, diode 75 becomes less reversed biased, until, due to noise pulses, the signal goes more negative than ground. This causes diode 75 to conduct and to clamp the voltage at the input to the grid electrode 70*d* approximately at ground. A normal video signal from the detector 14 may be on the order of 4 volts peak to peak. Because of the voltage division, K, afforded by resistors 31 and 37 about 3 volts peak to appears on grid 70*d*. If this signal has a noise pulse on the sync portion of the video of a substantial amplitude, no more than a few tenths of a volt will be applied to the input or grid electrode 70*d* of amplifier 21. Therefore due to this clamping action in the grid circuit of pentode 70**, which is evidenced by the waveshape of FIG. 2*b*, the output or anode waveshape of amplifier 21 has a relatively noise free sync pulse and is as shown in FIG. 2*c*. In FIG. 2*c* $+E_Q$ represents the quiescent plate voltage of amplifier 21 with $+V_A$ representing the B+ supply. It can be seen from FIGS. 2*b* and 2*c* that if the noise pulse were not limited, the plate voltage of amplifier 21 would approach $+V_A$ for noise pulses driving the pentode 70 to cutoff. This would allow excessive amplitude noise to be coupled to the sync separator 24 and the AGC supply 27 during the sync period and hence disturb their operation. Furthermore, to obtain similar action in the prior art circuit one had to raise the quiescent anode operating point $+E_Q$ of pentode amplifier 21 towards $+V_A$. This condition would operate the pentode 70 in a more non-linear portion of its characteristics. Furthermore, a change in the characteristics of pentode 70 from receiver to receiver, and with age, would affect the overall operation to a substantially greater extent in the prior art circuitry, than would such changes for the circuit shown in FIG. 1.

In the manner described, control of the bias or the operating point for pentode 70 also allows one to apply a larger signal to the AGC circuit 27, and hence afford a larger AGC loop gain characteristic for the receiver. One reason for this is that for the above described circuit the quiescent voltage at the plate electrode of pentode 21 is lower than the voltage of its prior art counterpart for equal noise immunity; as this necessitates operating the prior art device closer to cutoff and therefore at a higher plate potential. Therefore to apply a D.C. signal at an input to an AGC circuit requires more attenuation by the coupling network in the prior art circuit.

Primarily an AGC circuit responds to D.C. components in the video signal. For this purpose the AGC circuit is usually direct coupled to a suitable video amplifier. In any case the input to the AGC is usually applied at the grid electrode of a vacuum tube AGC circuit. In order to provide reliable operation a D.C. coupling path includes a voltage divider as resistors 85 and 86 (shown in FIG. 1), which couples the plate electrode of the video amplifier 21 to the input of the AGC supply 27. If the quiescent plate voltage of pentode 21 is controlled in the manner described above, then the magnitude of resistors 85 and 86 can be selected to assure higher magnitude amplitude signal for the AGC supply 27, under a wider spread of varying operating conditions as due to aging, different tube characteristics and so on. Whereas, in the prior art the divider usually was selected to be large enough to compensate for fluctuations in the quiescent operating point of the video amplifier stage while of a sufficient magnitude to couple enough signal for AGC operation. To accommodate both considerations, the divider would attenuate more and therefore a smaller signal would be applied to the AGC supply 27, when compared with the signal magnitude applied herein.

The maximum peak to peak video allowed from detector 14 is defined by the bias $+E_R$ for white video and the clamping voltage of diode 75 for sync tip. If the amplitude of this video is increased by a means of the AGC control, sync information will be clipped by diode 75 causing a loss of picture of the kinescope. A reduction of video amplitude by the same means will restore the picture. Thus this circuit provides a simple means for setting the proper detector level (AGC) for optimum performance by merely observing the picture tube without the need of an oscilloscope.

The following component values are representative of those which could be used in the circuit shown in FIG. 1.

| | |
|---|---|
| Resistor **31** | 5600 ohms. |
| Resistor **34** | 4700 ohms. |
| Resistor **35** | 1200 ohms. |
| Resistor **36** | 560,000 ohms. |
| Resistor **37** | 10,000 ohms. |
| Resistor **51** | 680 ohms. |
| Resistor **71** | 10,000 ohms. |
| Resistor **72** | 180 ohms. |
| Resistor **76** | 68,000 ohms. |
| Resistor **81** | 3300 ohms. |
| Resistor **82** | 22,000 ohms. |
| Inductor **39** | 100 microhenries. |
| Inductor **60** | 1.8 microhenries. |
| Inductor **77** | 120 microhenries. |
| Capacitor **38** | 10 micromicrofarads. |
| Capacitor **74** | 1000 micromicrofarads. |
| Capacitor **80** | 15 micromicrofarads. |
| Triode **45** | ½ 6HL8. |
| Pentode **70** | ½ 6HL8. |
| Diode **73, 75** | Silicon. |

For $+V_A$ of 280 volts and a $+V_B$ of 140 volts, the $+E_R$ reference would be approximately 5 volts (FIG. 2*a*).

What is claimed is:

1. A chroma, sync, AGC, driver amplifier for use in a color television receiver employing a video detector having an output coupled to a cathode follower for driving a luminance channel, said drive amplifier comprising, (a) a vacuum tube having grid, cathode and anode electrodes, (b) means for direct coupling said grid electrode to said output of said video detector, (c) means for A.C. coupling said grid electrode to said cathode follower to provide high frequency A.C. signals thereat, (d) means, including a load resistor, for applying operating potential to said anode electrode, (e) an impedance coupled between said cathode electrode and a point of reference potential, for self biasing said vacuum tube in a linear operating region, (f) a diode coupled between said grid electrode and a point on said impedance for clamping said grid to said self bias potential at said impedance point when a signal on said grid exceeds a specified level determined by the D.C. potential at said output of said detector.

2. The driver amplifier according to claim 1 wherein said vacuum tube is a pentode device.

3. The driver amplifier according to claim 1 wherein said impedance is a resistor and a second diode in series coupled between the cathode electrode and said point of reference potential, the junction between said resistor and second diode being coupled to said diode coupled between said grid and cathode electrode.

4. In a color television receiver including a video detector for providing a composite television signal at an output for driving a first video amplifier to provide signal drive to a luminance channel, in combination therewith a second amplifier for driving sync AGC and chroma circuits included in said receiver comprising, (a) means coupled to said video detector for referencing the output thereof to a D.C. level, (b) a vacuum tube having grid, plate and cathode electrodes, and having said grid electrode coupled to said output of said video detector for applying to said grid electrode said D.C. level.

(c) means including a load impedance, coupled to said plate electrode to supply an operating potential thereto, (d) an impedance coupled between the cathode electrode of said vacuum tube and a point of reference potential to bias said cathode at a potential with respect to said D.C. level sufficient to operate said tube in a linear region of its characteristics, (e) a unidirectional current device coupled between a point on said impedance and said grid electrode, to clamp said grid electrode at the potential present at said point of said impedance when a signal on said grid electrode exceeds a specified level determined by said D.C. level at said output signal detector, (f) means coupling said anode electrode to said sync, AGC and chroma circuits.

5. In a video amplifier for a color television receiver including a video detector for providing a composite television signal at its output for driving a first video amplifier to provide signal drive to a luminance channel, a second amplifier driven from said first amplifier for driving sync, and AGC circuits included in said receiver the improvement therewith comprising, (a) means coupled to said video detector for referencing the output thereof to a D.C. level, (b) a vacuum tube having grid, plate and cathode electrodes, and having its grid electrode coupled to said output of said video detector for applying to said grid electrode said D.C. level, (c) means including a load impedance, coupled to said plate electrode to supply an operating potential thereto, (d) an impedance coupled between the cathode of said vacuum tube and a point of reference potential to bias said cathode at a potential with respect to said D.C. level sufficient to operate said tube in a linear region of its characteristics, (e) a unidirectional current device coupled between a point on said impedance and said grid electrode, to clamp said grid electrode at the potential present at said point of said impedance when a signal on said grid electrode exceeds a specified potential with respect to said D.C. level.

6. In a color television receiver including a video detector for providing a composite television signal at an output for driving a first video amplifier to provide signal drive to a luminance channel, in combination therewith, a second amplifier for driving sync, and AGC circuits included in said receiver, comprising, (a) a pentode having grid, plate, cathode and screen electrodes, and having the grid electrode coupled to said output of said video detector, (b) means for applying operating potential to said plate and screen electrodes, (a) a first resistor coupled between said screen electrode and said video detector for referencing said output of said detector to a D.C. level, (d) means, including a series connected resistor and diode, coupled between the cathode of said pentode and a point of reference potential, for supplying a self-bias to said pentode, sufficient to operate said pentode on a linear portion of its characteristics, (e) a second diode coupled between the junction of said series connected resistor and diode and said grid electrode for clamping said grid electrode with respect to that portion of self bias potential present at said junction when the signal on said grid electrode exceeds a specified value determined by said D.C. level at said detector, (f) means coupling the anode electrode of said pentode to said AGC and sync circuits.

7. In a television receiver including a video detector of the type employing a diode device to provide a composite television signal at an output thereof for driving a first video amplifier to provide signal drive to a luminance channel, in combination therewith a second amplifier for driving an AGC circuit included in said receiver, comprising, (a) a pentode having grid, plate, cathode and screen electrodes and having the grid electrode coupled to said output of said video detector, (b) means for applying operating potential to said plate and screen electrodes, (c) means for referencing said output of said video detector to a first D.C. level, (d) means including a resistor coupled between said screen electrode and said video detector for referencing the input of said detector to a second D.C. level different from said first level by a potential of the order of magnitude of that potential that appears across said diode when conducting, (e) means coupled to said cathode electrode for supplying a self bias to said pentode sufficient to operate said pentode on a linear portion of its characteristics when compared to that bias on said grid electrode due to said first D.C. level at the output of said detector, (f) a diode coupled between said means and said grid electrode for clamping said grid with respect to at least a portion of said self bias potential present across said means when the signal on said grid exceeds a specified value determined by said D.C. levels, (g) means for direct coupling the anode electrode of said pentode to said AGC circuit.

References Cited

UNITED STATES PATENTS

| | | | |
|---|---|---|---|
| 2,302,520 | 11/1942 | Bingley. | |
| 2,892,080 | 6/1959 | Chauvin et al. | 328—71 |

FOREIGN PATENTS

| | |
|---|---|
| 790,338 | Great Britain. |

RICHARD MURRAY, Primary Examiner

DONALD E. STOUT, Assistant Examiner